United States Patent
Fuchimukai et al.

(10) Patent No.: US 6,873,357 B2
(45) Date of Patent: Mar. 29, 2005

(54) DIGITAL CAMERA HAVING A POSITION SENSOR

(75) Inventors: Atsushi Fuchimukai, Tokyo (JP); Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 517 days.

(21) Appl. No.: 09/752,740

(22) Filed: Jan. 3, 2001

(65) Prior Publication Data

US 2001/0007469 A1 Jul. 12, 2001

(30) Foreign Application Priority Data

Jan. 7, 2000 (JP) ........................................ 2000-001378

(51) Int. Cl.[7] .......................... H04N 5/228; H04N 5/225
(52) U.S. Cl. .............................. 348/208.2; 348/231.3; 348/374; 396/50; 396/53
(58) Field of Search .................... 348/208.99, 208.1, 348/208.2, 208.3, 699, 107, 382; 396/50, 52

(56) References Cited

U.S. PATENT DOCUMENTS

| 5,150,150 | A | * | 9/1992 | Enomoto ..................... 396/53 |
| 5,209,343 | A | * | 5/1993 | Romano et al. .......... 200/61.52 |
| 5,402,197 | A | * | 3/1995 | Okano et al. .................. 396/55 |
| 5,640,627 | A | * | 6/1997 | Nakano et al. ............. 396/296 |
| 5,669,147 | A | * | 9/1997 | Nakajima et al. ............. 33/334 |
| 5,686,665 | A | * | 11/1997 | Hara et al. ..................... 73/495 |
| 5,900,909 | A | * | 5/1999 | Parulski et al. .......... 348/231.6 |
| 6,148,149 | A | * | 11/2000 | Kagle .......................... 396/50 |
| 6,304,284 | B1 | * | 10/2001 | Dunton et al. ................ 348/36 |

* cited by examiner

*Primary Examiner*—Ngoc-Yen Vu
*Assistant Examiner*—Gevell Selby
(74) *Attorney, Agent, or Firm*—Greenblum & Bernstein, P.L.C.

(57) ABSTRACT

A digital camera includes a position sensor which detects a position of the camera body relative to the direction of gravity, an acceleration sensor which detects an acceleration acted upon the camera body, a memory in which image data of a captured image is recorded, and a controller. If the magnitude of the acceleration detected by the acceleration sensor when the captured image is produced is smaller than a predetermined value, the controller records the image data in the memory together with positional data of the camera body that is detected by the position sensor. If the magnitude of the acceleration detected by the acceleration sensor when the captured image is produced is equal to or greater than the predetermined value, the controller deems the data on the position of the camera body as invalid data and records only the image data in the memory.

16 Claims, 10 Drawing Sheets

DIGITAL CAMERA HAVING A POSITION SENSOR

BACKGROUND OF THE INVENTION

1. Field of the Invention

The present invention relates to a digital camera having a position sensor which detects the position or attitude of the camera body (e.g., horizontal or vertical position) relative to the direction of gravity.

2. Description of the Related Art

Digital cameras having record and playback modes that are provided with a position sensor for detecting the position (e.g., horizontal or vertical position) of the camera body relative to the direction of gravity are known in the art. In such known digital cameras, a captured image is recorded as image data together with corresponding position data in a record mode so that the reproduced image is indicated on a display monitor at an easy-to-see orientation (i.e., in such a manner that the upper and lower ends [vertical orientation] of a display monitor substantially coincide with the actual upper and lower positions [vertical orientation] of the reproduced image) in accordance with the corresponding recorded position data in playback mode.

Among such conventional digital cameras, especially in cameras that are provided with a ball-contact type inclination sensor as the position sensor for detecting the position of the camera body relative to the direction of gravity, it is sometimes the case that the inclination sensor cannot detect the position of the camera body properly if a picture is taken (namely, an image is captured) with an acceleration other than the acceleration of gravity (gravitational acceleration) being acted upon the camera body, e.g., if an image is captured while the camera is panned quickly. For instance, when an image is captured with the camera being held horizontally while the camera is panned quickly, the inclination sensor may erroneously determine that the camera is in a vertical position because of the acceleration acted upon the camera in a lateral direction while the camera is panned. If the inclination sensor erroneously detects the position of the camera body, image data is recorded together with incorrect position data, which results in the reproduced image being indicated on a display monitor at an difficult-to-see orientation in playback mode.

SUMMARY OF THE INVENTION

The present invention has been made in view of the aforementioned problems that reside in conventional digital cameras having a position sensor which detects the position or attitude of the camera body relative to the direction of gravity. An object of the present invention is to provide a digital camera having a position sensor which correctly detects the position of the camera body even if an acceleration other than the acceleration of gravity is acted upon the camera body when an image is captured while the camera is swung (e.g., panned) quickly, so that the reproduced image can be indicated on a display monitor in an easy-to-see orientation in playback mode at all times.

To achieve the object mentioned above, according to the present invention, a digital camera is provided, including a position sensor which detects a position of a camera body of the digital camera relative to the direction of gravity; at least one acceleration sensor which detects an acceleration acted upon the camera body; a memory in which image data of a captured image is recorded; and a controller. If the magnitude of the acceleration detected by the at least one acceleration sensor, at the time the captured image is produced, is smaller than a predetermined value, the controller records the image data in the memory together with data on a position of the camera body that is detected by the position sensor at the time the captured image is produced. If the magnitude of the acceleration detected by the at least one acceleration sensor at the time the captured image is produced is equal to or greater than the predetermined value, the controller deems the data on the position of the camera body as invalid data and records only the image data in the memory.

Preferably, the at least one acceleration sensor includes a first acceleration sensor which exclusively detects an acceleration in a horizontal direction and a second acceleration sensor which exclusively detects an acceleration in a vertical direction perpendicular to the horizontal direction.

In an embodiment, the position sensor includes a ball, a surface layer thereof being made of a conductive material.

In an embodiment, the position sensor includes a ball, a light emitting element and more than one light receiving element.

In the case where an acceleration detected by the acceleration sensor is in the opposite direction to the direction of gravity, the data on the position of the camera is recorded regardless of the magnitude of the acceleration.

The present disclosure relates to subject matter contained in Japanese Patent Application No. 2000-001378 (filed on Jan. 7, 2000) which is expressly incorporated herein by reference in its entirety.

BRIEF DESCRIPTION OF THE DRAWINGS

The invention will be discussed below in detail with reference to the drawings, in which.

DESCRIPTION OF THE PREFERRED EMBODIMENTS

Figure 3:
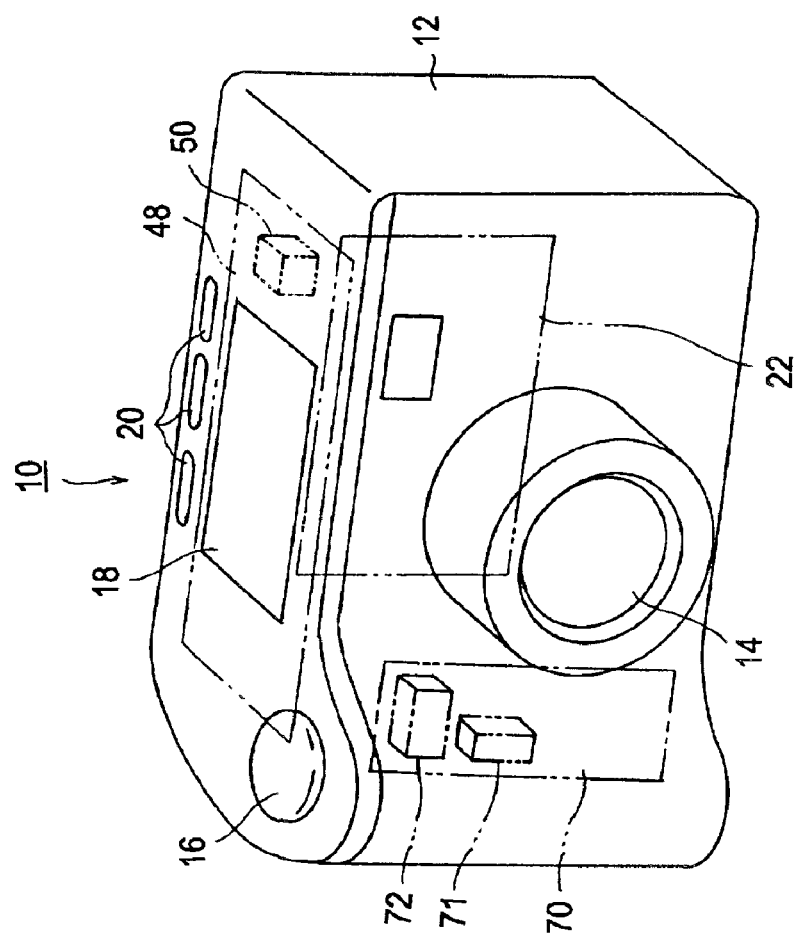
FIG. 3 is a perspective view of the digital camera of the present invention.
Figure 4:
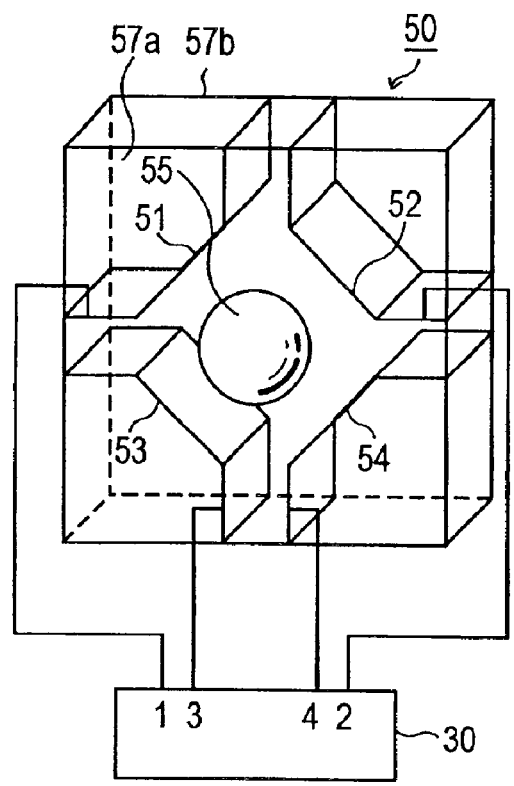
FIG. 4 is a schematic diagram of an inclination sensor provided in the digital camera shown in FIG. 3, in a state where the photographing lens of the digital camera is orientated in a upward or downward at an exact gravitational direction.
Figure 5:
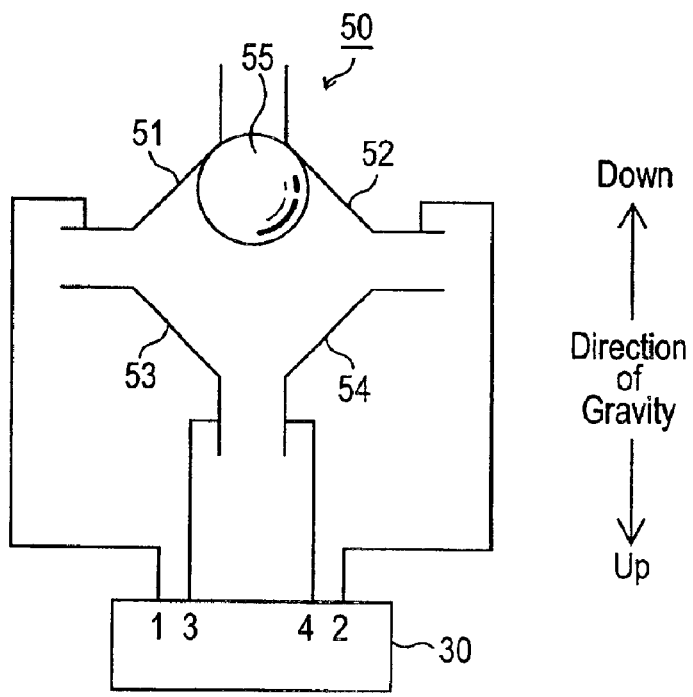
FIG. 5 is a schematic diagram of an inclination sensor provided in the digital camera shown in FIG. 3, in a state where the digital camera is held upside down.
Figure 6:
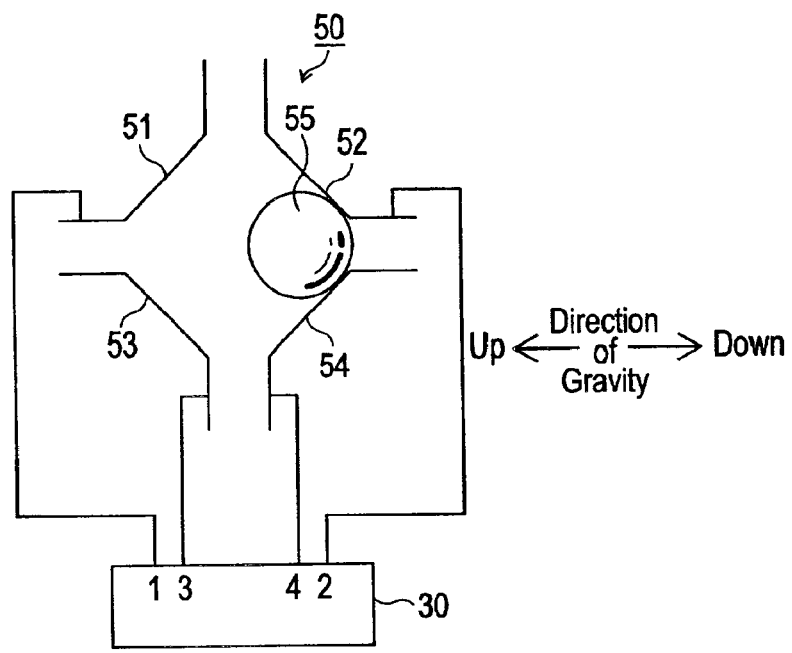
FIG. 6 is a schematic diagram of an inclination sensor provided in the digital camera shown in FIG. 3, in a state where the digital camera is held in a first vertical position.

FIG. 3 is a perspective view of an embodiment of a digital camera 10 to which the present invention is applied. The digital camera 10 is provided at the front of a camera body 12 with a photographing lens 14. The digital camera 10 is provided on top of the camera body 12 with a release button 16, an LCD panel 18, and a set of function buttons 20. The LCD panel 18 indicates various settings and photographic information of the camera body 12.

The digital camera 10 is provided, at the rear of the camera body 12 at the center of the rear face thereof, with a horizontally-elongated rectangular color LCD monitor (display monitor) 22. A monitoring image (video image) of the subject (object) is indicated on the LCD monitor 22 in record mode, while a captured image is reproduced to be indicated on the LCD monitor 22 in playback mode.

Figure 12:
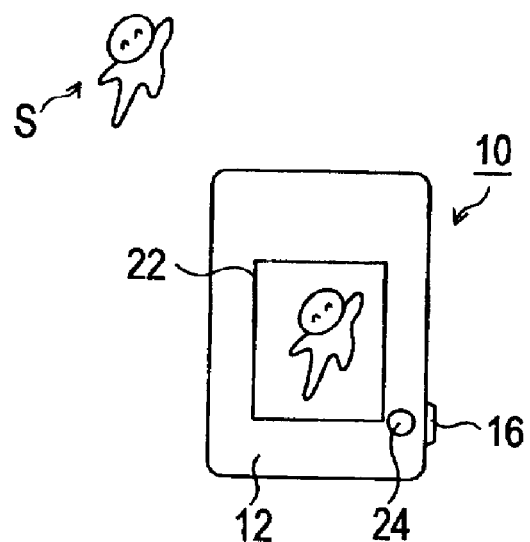
FIG. 12 is a schematic view of the digital camera shown in FIG. 3 and a person as a subject to be photographed, showing a state of taking a picture of the person with the digital camera being held vertically.
Figure 13:
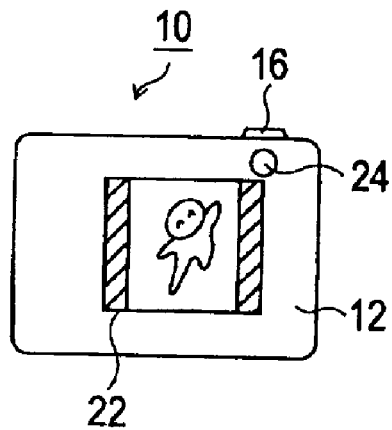
FIG. 13 is a schematic rear view of the digital camera shown in FIG. 3, showing a state where an image of the person that is recorded by the digital camera in the state shown in FIG. 12 is reproduced to be indicated on an LCD monitor of the digital camera with the digital camera in a horizontal position.

The digital camera 10 is provided at the rear of the camera body 12 with a mode select dial 24 (see FIGS. 12 and 13). The user can select either a record mode or a playback mode by operating the mode select dial when the power switch (not shown) of the digital camera 10 is ON.

The digital camera 10 is provided therein with an inclination sensor (position sensor) 50 (see FIG. 4 through 8) which detects the position/attitude (e.g., a horizontal or vertical position) of the camera body 12 relative to the direction of gravity. In the digital camera 10, image data of a captured image (captured image data) is recorded together with corresponding position data in a memory (nonvolatile RAM such as a flash memory) provided in a PC card 44 in record mode so that the reproduced image of the recorded image data is indicated on the LCD monitor 22 in an easy-to-see orientation (i.e., in such a manner that the upper and lower ends of the LCD monitor 22 substantially coincide with the actual upper and lower positions of the reproduced image) in accordance with the corresponding recorded position data in playback mode.

For instance, if the user takes a picture of a person (subject) "S" while holding the camera 10 vertically in record mode as shown in FIG. 12, the recorded image of the person "S" is reproduced to be indicated on the LCD monitor 22 in such a manner as shown in FIG. 13, so that the upper and lower ends of the LCD monitor 22 substantially coincide with the actual upper and lower positions of the reproduced image in playback mode. Furthermore, since the display monitor is normally rectangular or square, data which distinguishes which side out of four sides of the display monitor is an upper and lower side during a photographic operation is only required.

The digital camera 10 is provided therein with two acceleration sensors, i.e., first and second acceleration sensors 71 and 72. The first acceleration sensor exclusively detects an acceleration in the horizontal direction, while the second acceleration sensor 72 exclusively detects an acceleration in the vertical direction perpendicular to the horizontal direction (see FIG. 3). The first and second acceleration sensors 71 and 72 are fixed to a substrate 70 provided in the camera body 12. When the digital camera 10 is set at a normal horizontal position, the first acceleration sensor 71 detects the acceleration in the direction of gravity (vertical direction or upward/downward direction), and the second acceleration sensor 72 detects the acceleration in a left/right direction (horizontal direction) of the camera body 12.

Figure 15:
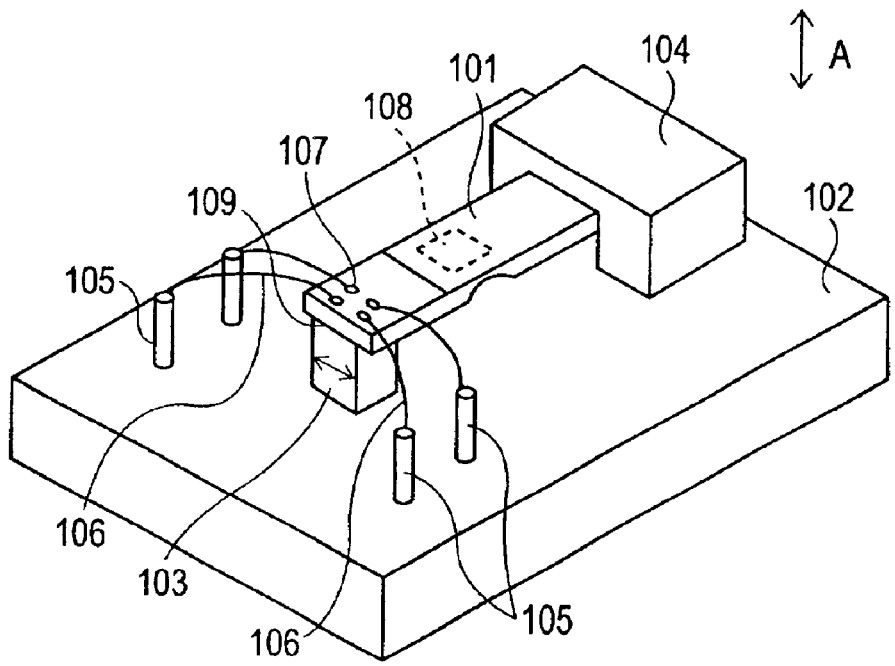
FIG. 15 shows a perspective view of a semiconductor acceleration detecting device.
Figure 16:
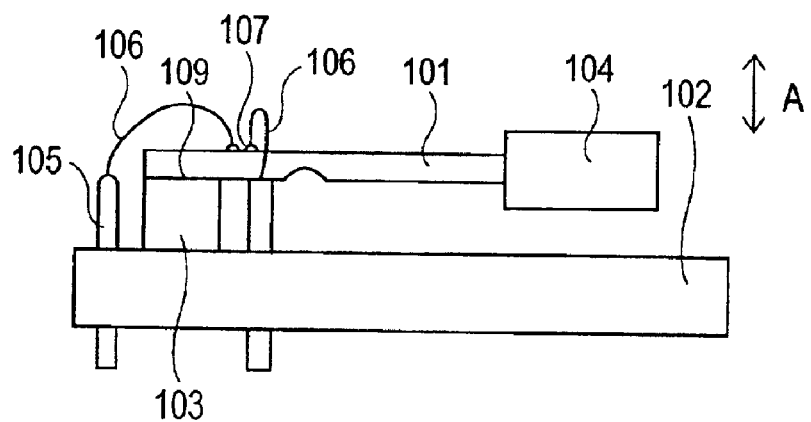
FIG. 16 shows a side elevation of the semiconductor acceleration detecting device shown in FIG. 15.

The first and second acceleration sensors (semiconductor acceleration detecting devices) 71 and 72 will herein be described with reference to FIGS. 15 and 16. FIG. 15 shows a perspective view of a semiconductor acceleration detecting device. In FIGS. 15 and 16, the semiconductor acceleration detecting device includes an acceleration detecting arm 101 which converts applied acceleration into electric signals; a base 102 of the semiconductor acceleration detecting device; a base seat 103 which has one end of the acceleration detecting arm 101 attached on the upper side thereof, and the lower surface thereof is fixed to the base 102 to thereby support the acceleration detecting arm 101; a weight 104 which is attached to the other end of the acceleration detecting arm 101; read-pins 105 for reading the electric signals output by the acceleration detecting arm 101 for external output of the semiconductor acceleration detecting device; wires 106 which transport the electric signals from the accelerations detecting arm 101 to the read-pins 105; a pad 107 for soldering the wires 106 which transport the electric signals from the accelerations detecting arm 101 to the read-pins 105; an acceleration detecting area 108 which forms a bridge circuit that converts acceleration into electric signals; and an adhesive 109. Since the acceleration detecting arm 101 is fixed at one end by the base seat 103, when acceleration is applied to the semiconductor acceleration detecting device in direction of arrow A, the acceleration detecting arm 101 bends due to inertia. Furthermore, since the weight 104 is attached to the other end of the acceleration detecting arm 101, the above-mentioned bending is further increased thereby. When the acceleration detecting arm 101 bends, the acceleration detecting area 108 deforms, and internal stress thereof occurs. The electrical equilibrium state of the bridge circuit (constructed from a resistor wherein a piezo resistance effect occurs due to the above-mentioned stress) is broken, so that the electric potential difference thus produced can be converted into electric signals. Thereafter, these electric signals are output to the filter/amplifier circuit 74 from the pad 107 via the wires 106 and the read-pins 105.

Figure 2:
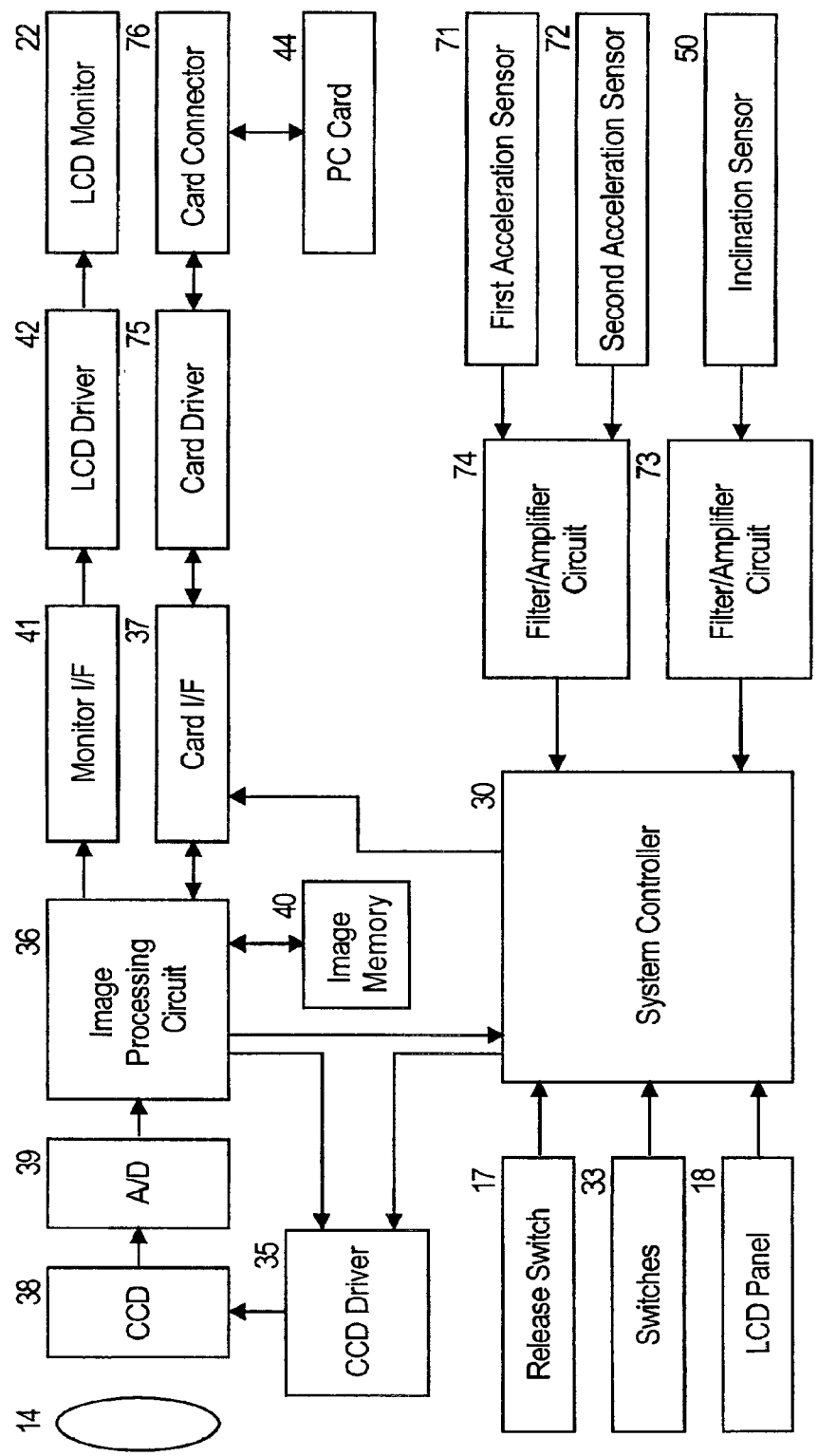
FIG. 2 is a block diagram of a circuit provided in the digital camera shown in FIG. 3.

FIG. 2 shows a circuit diagram of the digital camera 10. The digital camera 10 is provided therein with a system controller 30 which exclusively controls the overall operations of the digital camera 10. The system controller 30 is provide from a microcomputer. The digital camera 10 is further provided therein with a release switch 17 and a set of switches 33 which are connected to the system controller 30. The release switch 17 is associated with the release button 16, and the set of switches 33 are respectively associated with the set of function buttons 20. The aforementioned LCD panel 18 is connected to the system controller 30. The digital camera 10 is further provided therein with a filter/amplifier circuit 73, a filter/amplifier circuit 74, a CCD driver, 35, an image processing circuit 36 and a card I/F which are all connected to the system controller 30. The inclination sensor 50 is connected to the system controller 30 via the filter/amplifier circuit 73, while the first and second acceleration sensors 71 and 72 are connected to the system controller 30 via the filter/amplifier circuit 74.

The digital camera 10 is provided therein with a CCD image sensor 38 as an image pick-up device which is connected to the image processing circuit 36 via an A/D converter 39. Upon a depression of the release button 16, the image processing circuit 36 drives the CCD sensor 38 via a CCD driver 35 so that the object image focused on the sensitive surface of the CCD image sensor 38 is converted thereby into a picture signal. This picture signal read out of the CCD image sensor 38 is converted into a corresponding digital signal by the A/D converter 39. The image processing circuit 36 receives the digital signal from the A/D converter 39 to apply a predetermined image process to the digital signal to obtain image data. This image data is normally recorded in an image memory (buffer storage) 40. Image data making up at least one photographic picture which is written in the image memory 40 is recorded on the PC card 44.

The PC card 44 is connected to the card I/F 37 via the card driver 75 and the card connector 76. The image processing circuit 36 can record the captured image data in the PC card 44 via the card I/F 37, the card driver 75 and the card connector 76. The image processing circuit 36 can also transfer the image data recorded in the PC card 44 to the image memory 40 via the card I/F 37, the card driver 75 and the card connector 76.

Furthermore, when the image data is record on the PC card 44, the vertical direction data detected by the inclination sensor 50, shutter data, diaphragm value, date and time the photo was taken are also recorded as supplementary data.

A monitor I/F 41 is connected to the image processing circuit 36. Image data that is transmitted from the PC card 44 to the image memory (buffer storage) 40 is input to the monitor I/F 41 via the image processing circuit 36 in playback mode, while the monitoring image (motion video image) of the object which is focused on the CCD image sensor 38 is input to the monitor I/F 41 via the image processing circuit 36 in record mode. In each of record mode and playback mode, the image data is output to the LCD monitor 22 via the LCD driver 42 to be indicated as a reproduced image on the LCD monitor 22.

The structure of the inclination sensor 50, which detects the position of the camera body 12 relative to the direction of gravity, will be discussed in detail with reference to FIGS. 4 through 10. FIGS. 4 through 8 each show the structure of the inclination sensor 50. The inclination sensor 50 is fixedly mounted on the substrate 48 disposed in the camera body 12 (see FIG. 3) so that the top, bottom, right and left of each drawing of FIGS. 4 through 8 substantially correspond to the top, bottom, right and left of the camera body 12 (top, bottom, left and right as viewed in FIG. 3), respectively. The inclination sensor 50 is provided with first through fourth contacts 51, 52, 53 and 54 arranged as shown in each of FIGS. 4 through 8. The inclination sensor 50 is provided, in the space surrounded by the four contacts 51 through 54, with a metal ball 55. At least the surface layer of the metal ball 55 is made of a conductive material. Each of the first through fourth contacts 51 through 54 is connected to the system controller 30.

The front and rear openings of the space surrounded by the first through fourth contacts 51 through 54 (the two openings provided away from the page of FIG. 4 in a direction perpendicular to the page), have enough distance therebetween so as to allow the metal ball 55 to move freely within the space, i.e., the space is closed off by lids 57a and 57b which are formed from an insulating material provided apart from each other at a distance slightly larger than the diameter of the metal ball 55. The inclination sensor 50 is constructed so as to encase the four contacts 51 through 54 in a box (case), and one of the lids 57a or 57b can be formed as a base of the box. Alternatively, one of the lids 57a or 57b can be formed by the substrate 48. Furthermore, the lids 57a and 57b can have a concave shape (respect to the metal ball 55) in the center portion thereof so as to bulge outwards when viewed externally. Preferably, the lids 57a and 57b have a concave shape (respect to the metal ball 55) in the center portion thereof with a radius of curvature larger than that of the metal ball 55, so as to bulge outwards when viewed externally.

Figure 8:
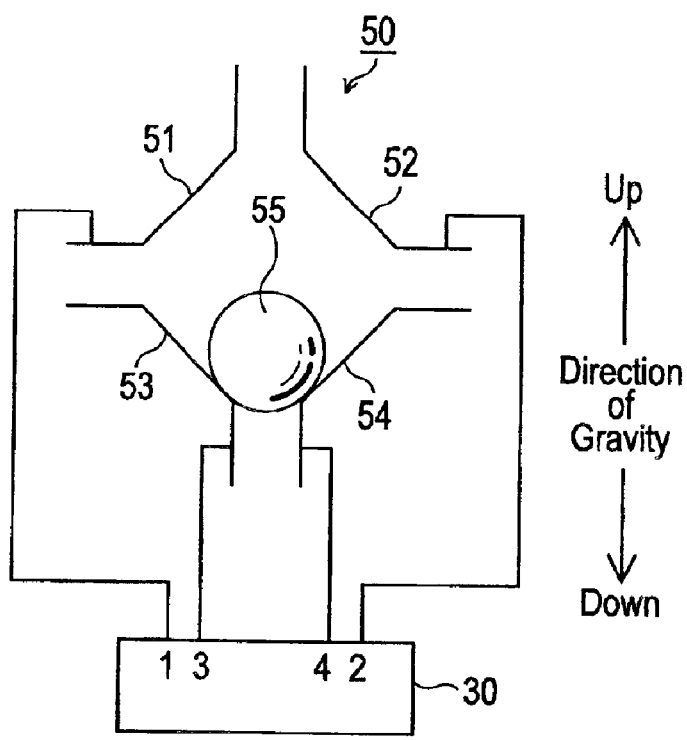
FIG. 8 is a schematic diagram of an inclination sensor provided in the digital camera shown in FIG. 3, in a state where the digital camera is held in a normal horizontal position.

If the digital camera 10 is held in a normal horizontal position as shown in FIG. 13, the metal ball 55 sits still at the position shown in FIG. 8, so that the third and fourth contacts 53 and 54 are short-circuited via the metal ball 55. If the digital camera 10 is held in a first vertical position (i.e., a position of the camera body 12 shown in FIG. 12 that is rotated clockwise about the optical axis of the photographing lens 14 by 90 degrees from the horizontal position shown in FIG. 13), the metal ball 55 sits still at the position shown in FIG. 6, so that the second and fourth contacts 52 and 54 are short-circuited via the metal ball 55.

Figure 7:
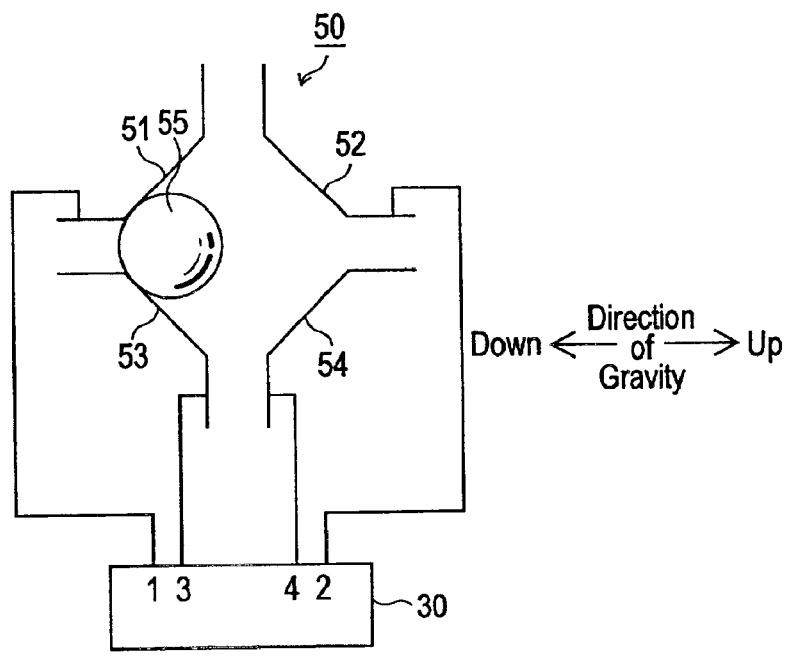
FIG. 7 is a schematic diagram of an inclination sensor provided in the digital camera shown in FIG. 3, in a state where the digital camera is held in a second vertical position.

If the digital camera 10 is held in a second vertical position (i.e., a position of the camera body 12 that is rotated counterclockwise about the optical axis of the photographing lens 14 by 90 degrees from the horizontal position shown in FIG. 13), the metal ball 55 sits still at the position shown in FIG. 7, so that the first and third contacts 51 and 53 are short-circuited via the metal ball 55. If the digital camera 10 is held upside down (i.e. a position of the camera body 12 that is rotated clockwise or counterclockwise about the optical axis of the photographing lens 14 by 180 degrees from the horizontal position shown in FIG. 13), the metal ball 55 sits still at the position shown in FIG. 5, so that the first and second contacts 51 and 52 are short-circuited via the metal ball 55. Moreover, if the digital camera 10 is held with the photographing lens 14 being orientated in a fully upward or downward direction, the metal ball 55 stays still at the position shown in FIG. 4, so that none of the first through fourth contacts 51 through 54 are short-circuited.

Accordingly, in the inclination sensor 50, the first and third contacts 51 and 53 together constitute a first switch SW1, the first and second contacts 51 and 52 together constitute a second switch SW2, the second and fourth contacts 52 and 54 together constitute a third switch SW3, and the third and fourth contacts 53 and 54 together constitute a fourth switch SW4. Each of the first through fourth switches SW1, SW2, SW3 and SW4 is turned ON when the metal ball 55 contacts thereto, and is turned OFF when the metal ball 55 does not contact thereto.

Figure 10:
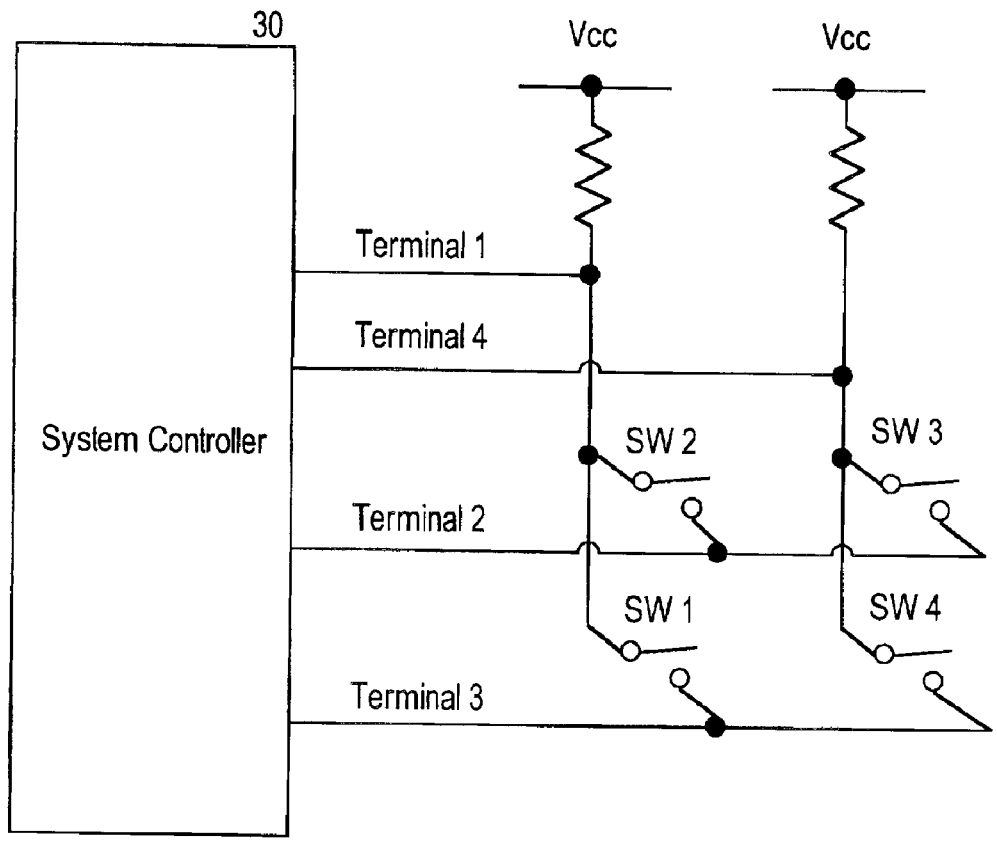
FIG. 10 is a schematic diagram of a system controller and the switches of the inclination sensor, showing the structure of connection therebetween.

The system controller 30 is provided with first through fourth terminals 1, 2, 3 and 4 which are connected to the first through fourth contacts 51, 52, 53 and 54, respectively. FIG. 10 is a schematic diagram of a system controller 30 and the first through fourth switches SW1, SW2, SW3 and SW4 of the inclination sensor 50, showing the structure of connection between the first through fourth terminals 1, 2, 3 and 4 and the switches SW1, SW2, SW3 and SW4.

Figure 11:
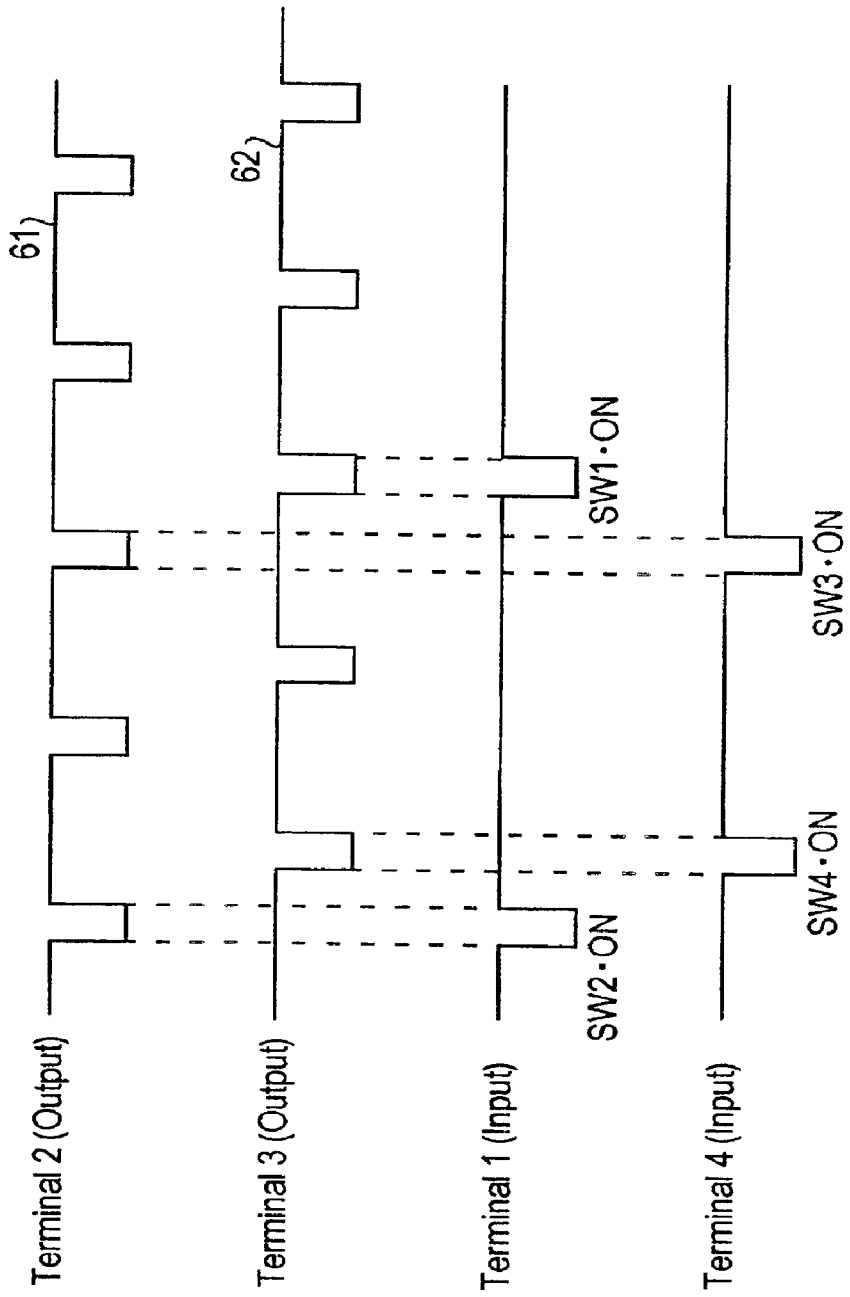
FIG. 11 is an embodiment of a time chart of pulse signals which are output from the system controller shown in FIG. 10 to be input to the inclination sensor, and pulse signals which are output from the inclination sensor to be input to the system controller.

FIG. 11 is an embodiment of a time chart of pulse signals which are output from the system controller 30 to be input to the inclination sensor 50, and pulse signals which are output from the inclination sensor 50 to be input to the system controller 30. In this embodiment, the system controller 30 regularly outputs a first pulse signal 61 from the second terminal 2 to be input to the second contact 52. At the same time, the system controller 30 regularly outputs a second pulse signal 62 from the third terminal 3 to be input to the third contact 53. It can be understood from the connecting structure shown in FIG. 10 that the first pulse signal 61 output from the second terminal 2 is output from the first terminal 1 at the time the second switch SW2 is turned ON or the fourth terminal 4 at the time the third switch SW3 is turned ON. Likewise, the second pulse signal 62 output from the third terminal 3 is output from the first terminal 1 at the time the first switch SW1 is turned ON or the fourth terminal 4 at the time the fourth switch SW4 is turned ON.

The system controller 30 continuously monitors the first and fourth terminals 1 and 4 to check whether any signals are input thereto. The system controller 30 determines that the second switch SW2 has been turned ON (i.e., that the digital camera 10 is held upside down) upon detecting that the first pulse signal 61 output to the second terminal 2 is input from the first terminal 1. The system controller 30 determines that the third switch SW3 has been turned ON (i.e., the digital camera 10 is held in a position shown in FIG. 12 that is rotated clockwise about the optical axis of the photographing lens 14 by 90 degrees from the horizontal position) upon detecting that the first pulse signal 61 output to the second terminal 2 is input from the fourth terminal 4. The system controller 30 determines that the first switch SW1 has been turned ON (i.e., the digital camera 10 is held in a position rotated counterclockwise about the optical axis of the photographing lens 14 by 90 degrees from the horizontal position) upon detecting that the second pulse signal 62 output to the third terminal 3 is input from the first terminal 1. The system controller 30 determines that the fourth switch SW4 has been turned ON (i.e., that the digital camera 10 is held in a normal horizontal position) upon detecting that the second pulse signal 62 output to the third terminal 3 is input from the fourth terminal 4.

Figure 1:
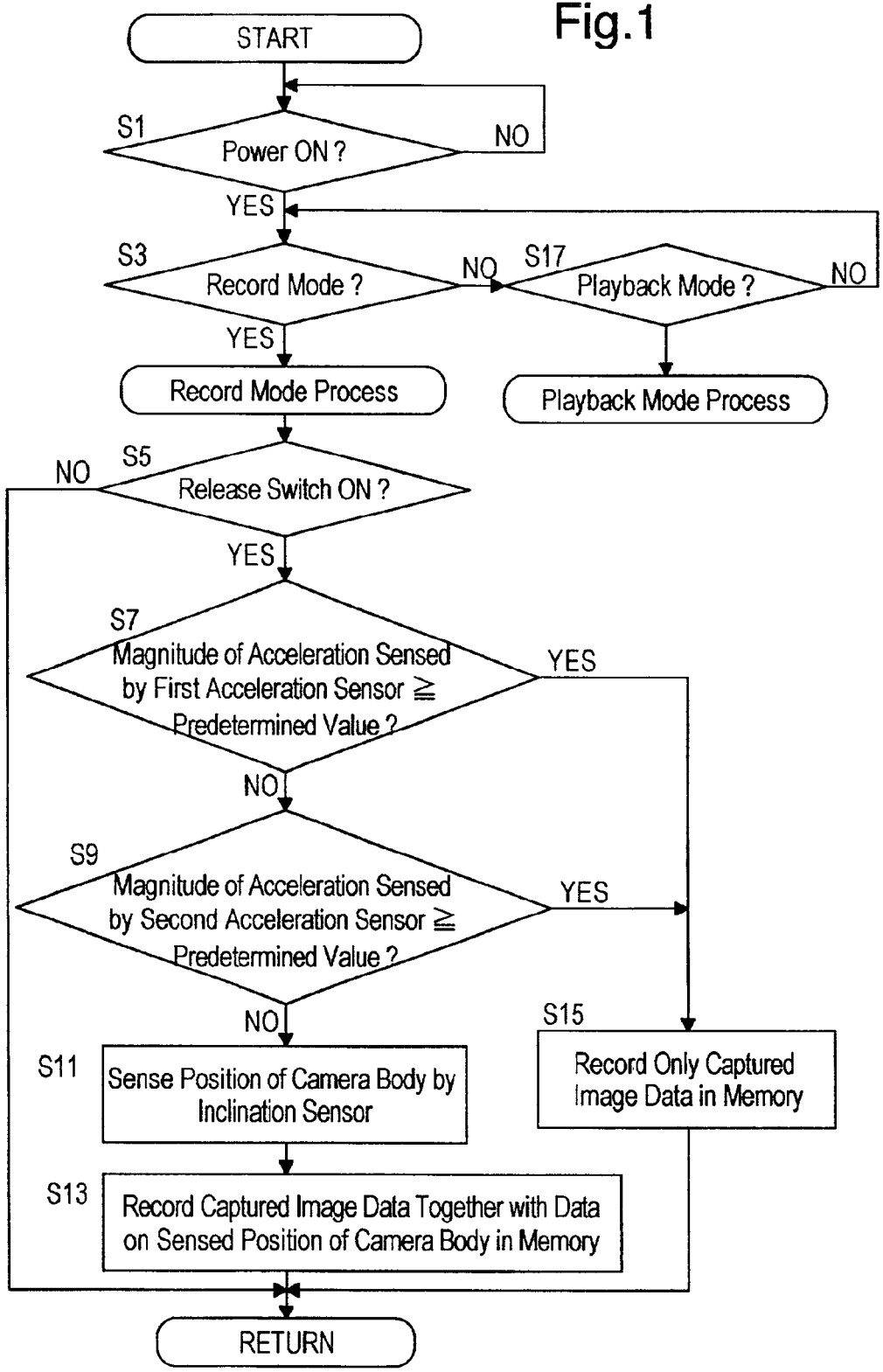
FIG. 1 is a flow chart of a control process performed by a system controller provided in a digital camera shown in FIG. 3 to which the present invention is applied.

FIG. 1 is a flow chart of a control process performed by the system controller 30. In this control process, firstly it is determined whether the power of the digital camera 10 is ON (step S1). Control proceeds to the operation at step S3 if the power is ON or repeats the operation at step S1 if the power is OFF. If it is determined at step S1 that the power is ON, it is determined whether record mode has been selected (step S3). If the record mode has been selected, control enters a record mode process ("Record Mode Process") in which it is firstly determined whether the release switch 17 is ON (step S5).

If it is determined at step S5 that the release switch 17 is ON, it is determined whether the magnitude of an acceleration detected by the first acceleration sensor 71 is equal to or greater than a predetermined value (step S7). If it is determined at step S7 that the magnitude of an acceleration detected by the first acceleration sensor 71 is smaller than the predetermined value, it is determined whether the magnitude of an acceleration detected by the second acceleration sensor 72 is equal to or greater than a predetermined value (step S9). If it is determined that the magnitude of each of the accelerations detected by the first and second acceleration sensors 71 and 72 is smaller than the predetermined value, control proceeds to step S11 at which the position or altitude of the camera body 12 is detected by the inclination sensor 50. Subsequently, captured image data is recorded together with data on the detected position (position data) of the camera body 12 in the memory in the PC card 44 (step S13). The system controller 30 determines the actual upper and lower positions of each captured image in accordance with the corresponding position data recorded in the memory in the PC card 44.

If it is determined at step S7 that the magnitude of an acceleration detected by the first acceleration sensor 71 is equal to or greater than the predetermined value, the position data detected by the inclination sensor 50 at the time the image is captured is regarded as invalid data, so that only captured image data is recorded in the memory in the PC card 44 (step S15). This process is performed due to the following reason. When an image is captured with the digital camera 10 being held horizontally while the digital camera 10 is panned, an acceleration is acted upon the digital camera 10 in a lateral direction. If the magnitude of an acceleration acted upon the digital camera 10 in a lateral direction is greater than a predetermined value, the metal ball 55 in the inclination sensor 50 does not stay still at the position shown in FIG. 8 even if the camera body 12 is held horizontally. This prevents the third and fourth contacts 53 and 54 from being short-circuited via the metal ball 55. Furthermore, if the magnitude of an acceleration acted upon the digital camera 10 in a lateral direction is very large, the metal ball 55 may move to the position shown in FIG. 6 or 7. Accordingly, if the magnitude of an acceleration acted upon the digital camera in a lateral direction is greater than a predetermined value, the inclination sensor may wrongly determine that the digital camera is in a vertical position even if the digital camera is held horizontally. To prevent this problem from occurring, according to the present embodiment of the digital camera 10, if the magnitude of an acceleration detected by the first acceleration sensor 71 is equal to or greater than the predetermined value, the position data detected by the inclination sensor 50 at the time the image is captured is regarded as invalid data, so that only captured image data is recorded in the memory in the PC card 44.

If it is determined at step S9 that the magnitude of an acceleration detected by the second acceleration sensor 72 is equal to or greater than a predetermined value, the position data detected by the inclination sensor 50 at the time the image is captured is regarded as invalid data, similar to the operation at step S7, so that only captured image data is recorded in the memory in the PC card 44 (step S15). This process is performed due to the following reason. When a picture is captured with the digital camera 10 being held horizontally while the digital camera 10 is moved vertically, an acceleration is acted upon the digital camera 10 in a vertical direction. If the magnitude of an acceleration acted upon the digital camera 10 in a vertical direction is greater than a predetermined value, the metal ball 55 in the inclination sensor 50 does not sit still at the position shown in FIG. 8 even if the camera body 12 is held horizontally. This prevents the third and fourth contacts 53 and 54 from being short-circuited via the metal ball 55. Furthermore, if the magnitude of an acceleration acted upon the digital camera 10 in a vertical direction is very large, the metal ball may move to the position shown in FIG. 5. Accordingly, if the magnitude of an acceleration acted upon the digital camera in a vertical direction is greater than a predetermined value, the inclination sensor may wrongly determine that the digital camera is held upside down even if the digital camera is held horizontally. To prevent this problem from occurring, according to the present embodiment of the digital camera 10, if the magnitude of an acceleration detected by the second acceleration sensor 72 is equal to or greater than the predetermined value, the position data detected by the inclination sensor 50 at the time the image is captured is also regarded as invalid data, so that only captured image data is recorded in the memory in the PC card 44.

Furthermore, in the case where the camera 10 is rotated upwards (upward panning) in a direction against the direction of gravity, since the metal ball 55 does not move from the lowest position in the direction of gravity, there is less chance of the inclination sensor 50 from erroneously detecting the attitude of the camera 10. Accordingly, since it can be determined whether the camera 10 is being panned upward by the detected position of the metal ball 55 before the detecting of the acceleration sensors 71 and 72 and by when the direction of acceleration is detected by the acceleration sensors 71 and 72, an arrangement can be provided so that when the camera 10 is being panned upwards, the data on the detected position (position data) of the camera body 12 can be recorded.

If it is determined at step S3 that record mode has not been selected, it is determined whether playback mode has been selected (step S17). If playback mode has been selected, control proceeds to a playback mode process ("Playback Mode Process"). If playback mode has not been selected, control returns to step S3.

As can be understood from the above discussion, according to the digital camera 10 to which the present invention is applied, captured image data is not recorded together with incorrect position data detected by the inclination sensor 50 when the image is captured with an acceleration being acted on the digital camera 10 whose magnitude is equal to or greater than a predetermined value.

Figure 14:
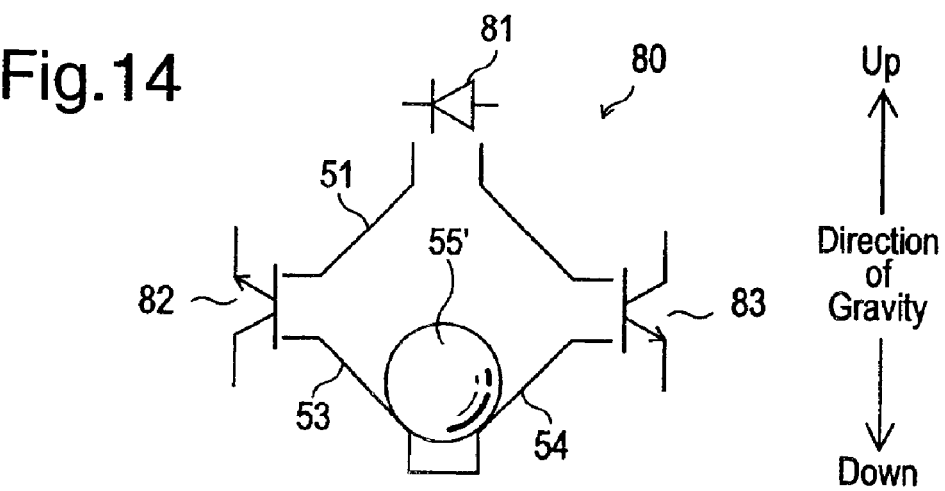
FIG. 14 is a schematic diagram of another embodiment of an inclination sensor.
Figure 9:
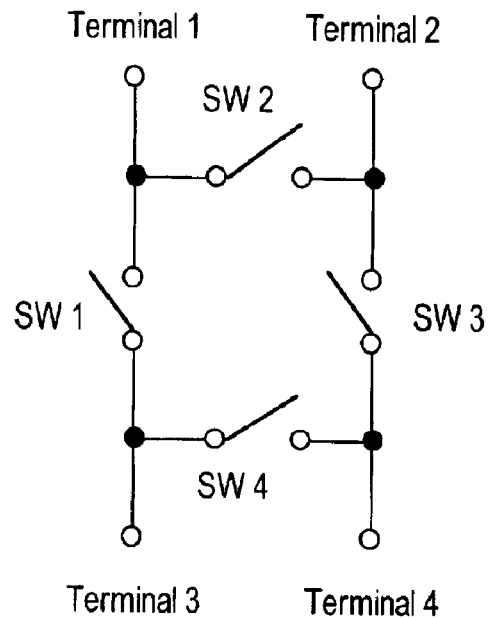
FIG. 9 is a schematic diagram of switches of the inclination sensor shown in FIGS. 4 through 8.

The present invention is not limited solely to the above illustrated embodiment. For instance, the inclination sensor 50 can be replaced by any other sensor which can detect the position or attitude of the digital camera 10. For instance, an inclination sensor 80 shown in FIG. 14 can be used instead. The inclination sensor 80 is composed of an LED (light emitting element) 81, two phototransistors (light receiving elements) 82 and 83, and a ball 55'. In this embodiment, if the inclination sensor 80 is rotated counterclockwise by 90 degrees as viewed in FIG. 14, it is determined that the digital camera is in a vertical position because the light emitted from the LED 81 to be incident on the phototransistor 82 is interrupted by the ball 55'. Likewise, if the inclination sensor 80 is rotated clockwise by 90 degrees as viewed in FIG. 14, it is determined that the digital camera is in another vertical position because the light emitted from the LED 81 to be incident on the phototransistor 83 is interrupted by the ball 55'. Furthermore, if the inclination sensor 80 is rotated clockwise or counterclockwise by 180 degrees with respect to the orientation of FIG. 14; namely, if the inclination sensor 80 is positioned upside down, it is determined that the digital camera is held upside down because the light emitted from the LED 81 to enter the space in the inclination sensor 80 is interrupted by the ball 55'.

Each of the acceleration sensors 71 and 72 can be replaced by any other device which can detect an acceleration acted upon the camera body.

As can be understood from the foregoing, according to the digital camera having a inclination sensor (position sensor) to which the present invention is applied, since the controller deems the data on the position of the camera body as invalid data and records only the image data in the memory if the magnitude of the acceleration detected by the at least one acceleration sensor at the time the captured image is produce is equal to or greater than the predetermined value, the position sensor does not erroneously detect the position of the camera body even if an acceleration other than the acceleration of gravity is acted upon the camera body when an image is captured while the camera is swung (e.g., panned), so that the reproduced image can be indicated on a display monitor at an easy-to-see orientation in playback mode at all times.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital camera comprising;
    a position sensor which detects a position of a camera body of said digital camera relative to the direction of gravity;
    at least one acceleration sensor which detects acceleration acting upon said camera body;
    a memory in which image data of a captured image is recorded; and
    a controller,
    wherein if the magnitude of said acceleration detected by said at least one acceleration sensor at the time said captured image is obtained is smaller than a predetermined value, said controller records said image data in said memory together with data on a position of said camera body that is detected by said position sensor at the time said captured image is obtained, and
    if the magnitude of said acceleration detected by said at least one acceleration sensor at the time said captured image is obtained is equal to or greater than said predetermined value, said controller considers said data on said position of said camera body as invalid data, records said image data in said memory, and does not record said data on said position of said camera body in said memory.

2. The digital camera according to claim 1, wherein said at least one acceleration sensor comprises:
    a first acceleration sensor which exclusively detects an acceleration in a horizontal direction; and
    a second acceleration sensor which exclusively detects an acceleration in a vertical direction perpendicular to said horizontal direction.

3. The digital camera according to claim 1, wherein said position sensor comprises a ball, a surface layer of said ball comprising a conductive material.

4. The digital camera according to claim 1, wherein said position sensor comprises a ball, a light emitting element and more than one light receiving element.

5. The digital camera according to claim 1, wherein when an acceleration detected by said acceleration sensor is in a direction opposite to the direction of gravity, said data on said position of said camera is recorded regardless of the magnitude of said acceleration.

6. A camera comprising:
    a position sensor which detects a position of a camera body of said camera relative to the direction of gravity;

at least one acceleration sensor which detects acceleration acting upon the camera body;

a memory in which image data of a captured image is recorded; and a controller, which determines position data of the camera body relative to the direction of gravity as invalid data when it is determined that the magnitude of the acceleration detected by said at least one acceleration sensor is equal to or greater than a predetermined value and controls a camera function to record said image data in said memory and to not record said position data in said memory in accordance with said determination.

7. The camera according to claim 6, wherein said controller records, in said memory, said image data and position data, detected by the position sensor, when the magnitude of the acceleration detected by said at least one acceleration sensor is smaller than a predetermined value.

8. The camera according to claim 6, wherein said at least one acceleration sensor comprises:

a first acceleration sensor which detects an acceleration in a horizontal direction; and a second acceleration sensor which detects an acceleration in a direction substantially perpendicular to said horizontal direction.

9. The camera according to claim 6, said position sensor including a ball, a surface layer of said ball comprising a conductive material.

10. The camera according to claim 6, said position sensor including a ball, a light emitting element and more than one light receiving element.

11. The camera according to claim 6, wherein said controller records the position data when the acceleration detected by said acceleration sensor is in a direction opposite to the direction of gravity, regardless of the magnitude of the acceleration.

12. A camera comprising:

a position sensor which detects a position of a camera body relative to the direction of gravity;

at least one acceleration sensor which detects acceleration acting upon the camera body; and a controller, which records image data and position data detected by the position sensor, when the magnitude of the acceleration detected by said at least one acceleration sensor is smaller than a predetermined value and does not record position data together with image data when the magnitude of the acceleration detected by said at least one acceleration sensor is equal to or greater than the predetermined value.

13. The camera according to claim 12, wherein said at least one acceleration sensor comprises:

a first acceleration sensor which detects an acceleration in a horizontal direction; and a second acceleration sensor which detects an acceleration in a direction substantially perpendicular to said horizontal direction.

14. The camera according to claim 12, wherein said position sensor includes a ball, a surface layer of said ball comprising a conductive material.

15. The camera according to claim 12, wherein said position sensor includes a ball, a light emitting element and more than one light receiving element.

16. The camera according to claim 12, wherein said controller records the position data when the acceleration detected by said acceleration sensor is in the opposite direction to the direction of gravity, regardless of the magnitude of the acceleration.

* * * * *